United States Patent [19]

Paranjpe et al.

[11] Patent Number: 4,566,014

[45] Date of Patent: Jan. 21, 1986

[54] DROP COUNTER PRINTER CONTROL SYSTEM

[75] Inventors: Suresh C. Paranjpe, Dallas; Burton W. Scott, Plano, both of Tex.; Henry N. Kannapell, Raleigh, N.C.

[73] Assignee: The Mead Corporation, Dayton, Ohio

[21] Appl. No.: 615,625

[22] Filed: May 31, 1984

[51] Int. Cl.[4] .......................... G01P 15/18; B41J 5/44; B41J 13/08

[52] U.S. Cl. ........................................ 346/1.1; 346/75; 346/140 R; 101/232; 101/416 A; 101/426; 400/126

[58] Field of Search ...................... 346/75, 140 R, 1.1; 101/416 A, 426; 400/126

[56] References Cited

U.S. PATENT DOCUMENTS 4,121,222 10/1978 Diebold et al. .

4,469,026 9/1984 Irwin .................................. 101/426

OTHER PUBLICATIONS

Information Disclosure No. 18508, Published In The Sep. 1979, Issue Of Research Disclosure, Disclosed By Suresh C. Paranjpe And Surinder K. Bahl.

*Primary Examiner*—E. A. Goldberg
*Assistant Examiner*—Gerald E. Preston
*Attorney, Agent, or Firm*—Biebel, French & Nauman

[57] ABSTRACT

The intersheet gaps or spacings between successive sheets of copy paper for an ink jet printing system are set according to the print densities for sheets to be printed to enhance the operation of a sheet dryer within the printing system. The greater the print density, the greater the intersheet gaps such that sheets which are more heavily printed are effectively exclusively within the sheet dryer for a longer period of time and, hence, receive more of the available sheet dryer energy. The print densities are determined from image data which define images to be printed on the sheets by translating the data into the number of drops to be printed per image data word and accumulating the number of drops required to print each sheet by counting the resulting numbers of drops.

9 Claims, 2 Drawing Figures

DROP COUNTER PRINTER CONTROL SYSTEM

BACKGROUND OF THE INVENTION

The present invention relates generally to a printing system and, more particularly, to the control of an ink drop printing system based on the ink to be deposited on each page to be printed.

In printing systems in which images are printed by depositing drops of ink onto a sheet of paper, such as ink jet printers, drying the ink which has been deposited upon a sheet of paper presents a problem. This is the case since such printers generally use a water base ink and deposit a substantially greater volume of ink in forming a print image than do other types of printers. It is desirable to rapidly dry the ink in a small dryer section of the printer utilizing a minimum amount of energy. In an office environment, reduced space and energy requirements are particularly important.

An illustrative ink drying system for an ink jet printer is described in the September, 1979 issue of *Research Disclosure* as Disclosure No. 18508. In the disclosed drying system, air surrounding the sheet of copy paper is drawn through a bed of hygroscopic material to remove moisture from the air. The dried air is then heated by passing it through an electronic subsystem which controls the ink jet printer and an illumination subsystem of the printer. The dried and heated air is then blown at high velocity onto a printed sheet of paper to accelerate drying of the ink deposited thereon. The hygroscopic material is regenerated by heaters within the bed which heat the material when the printer is not in operation to thereby remove moisture from the bed.

The drying system, as disclosed, may also require supplemental heating by means of quartz lamps or otherwise. The supplemental heating typically is needed only for drying copies which have a large amount of ink deposited thereon. A detector arrangement may be provided to determine the amount of ink used for printing the largest solid ink covered area to produce a control signal which is used to switch on the supplemental heating only as needed. The detector control signal may also be used to slow the speed of travel of the copy paper through the drying section of the printer when a large amount of ink has been deposited upon a paper sheet.

While the disclosed sheet dryer for an ink jet printer is highly efficient, it accommodates increased drying requirements by means of supplemental heating and ultimately by also slowing the speed of travel of the copy paper through the dryer. Both of these measures are undesirable. Supplemental heating requires additional energy input and a slowed paper speed may complicate the printing process. Since the paper path through the dryer is typically a portion of a continuous path including the transportation of the paper past the ink jet printing apparatus, a speed reduction requires adjustment of the rather complex control of the ink jet printer. Therefore, it is desirable to maintain a constant speed through the dryer/printer section to simplify the control of the ink jet printer.

It is, thus, apparent that the need exists for an improved method and apparatus for controlling an ink jet printer to facilitate drying of printed paper sheets while neither interfering with the printing operation nor requiring supplemental heating devices.

SUMMARY OF THE INVENTION

In accordance with the present invention, ink drop printer means are connected for printing image patterns defined by image data onto sheets of paper which are conveyed past the printer means by transport means. Sheet feeder means are provided for feeding paper sheets into the transport means and dryer means receive and dry printed sheets conveyed by the transport means. Monitor means are provided for determining the print density or number of ink drops required for printing each sheet in response to the corresponding image data, and control means operate the sheet feeder means to feed the paper sheets into the transport means such that the intersheet gaps are based on the number of ink drops required for printing sheets of paper whereby the operation of the dryer means is enhanced.

Preferably, the dryer means is physically small and efficiently utilizes a minimum amount of energy to dry printed sheets of paper passed therethrough. For simplicity, dryer means having a fixed energy input is also preferred with the fixed energy input being derived from heat generating subsystems of the printing system or otherwise and providing a sufficient amount of drying capacity to dry the most heavily printed paper sheet contemplated for generation by the printing system.

The intersheet spacing between successive sheet of paper is set according to the amount of ink to be deposited on the sheets such that the energy provided by the dryer is appropriate for drying each printed sheet. By adjusting the intersheet spacing or gaps between successive sheets of printed paper, the time during which a given printed sheet is effectively exclusively within the dryer and, hence, receiving substantially the entire drying energy available from the dryer, can be adjusted.

While a minimum intersheet gap is required for movement of sheets through the machine, the minimum intersheet gap will place more than one sheet within the dryer at a time. This is, of course, dependent upon the dryer size; however, when more than one sheet is within the dryer at a given time, the available drying energy is divided between the sheets within the dryer. By widening the intersheet gap between successive sheets of paper, the effective exclusive time of a sheet within the dryer is expanded in correspondence with the widths of the intersheet gaps. In accordance with the present invention, the print densities are determined by the amounts and location of ink to be deposited on sheets of paper within the printing system and the print densities are used to set the intersheet gaps.

Apparatus is provided for monitoring the image data to determine the number of ink drops required for printing each sheet. Translator means converts the image data into the number of ink drops required to print the defined image patterns and accumulator means accumulates the number of ink drops required for printing the image patterns for each sheet. The accumulator means in accordance with the present invention preferably comprises a counter circuit.

It is, therefore, an object of the present invention to provide an improved control system for an ink drop printing system which enhances the operation of the printing system sheet dryer.

It is another object of the present invention to provide an improved control system for an ink drop printing system wherein the ink to be deposited on each printed sheet is utilized to control the intersheet spacing between successive sheets fed to the printing system such that the operation of a sheet dryer within the system is enhanced.

It is yet another object of the present invention to provide an improved control system for an ink drop printing system wherein the number of ink drops to be deposited on each sheet is determined by translating image data representative of image patterns into the number of ink drops required to print such patterns and accumulating the number of ink drops required for printing the image patterns for each sheet such that the intersheet spacing between sheets fed into the ink drop printing system can be selected to enhance the operation of a sheet dryer within the printing system.

Other objects and advantages of the invention will be apparent from the following description, the accompanying drawings and the appended claims.

DETAILED DESCRIPTION OF THE INVENTION

Figure 1:
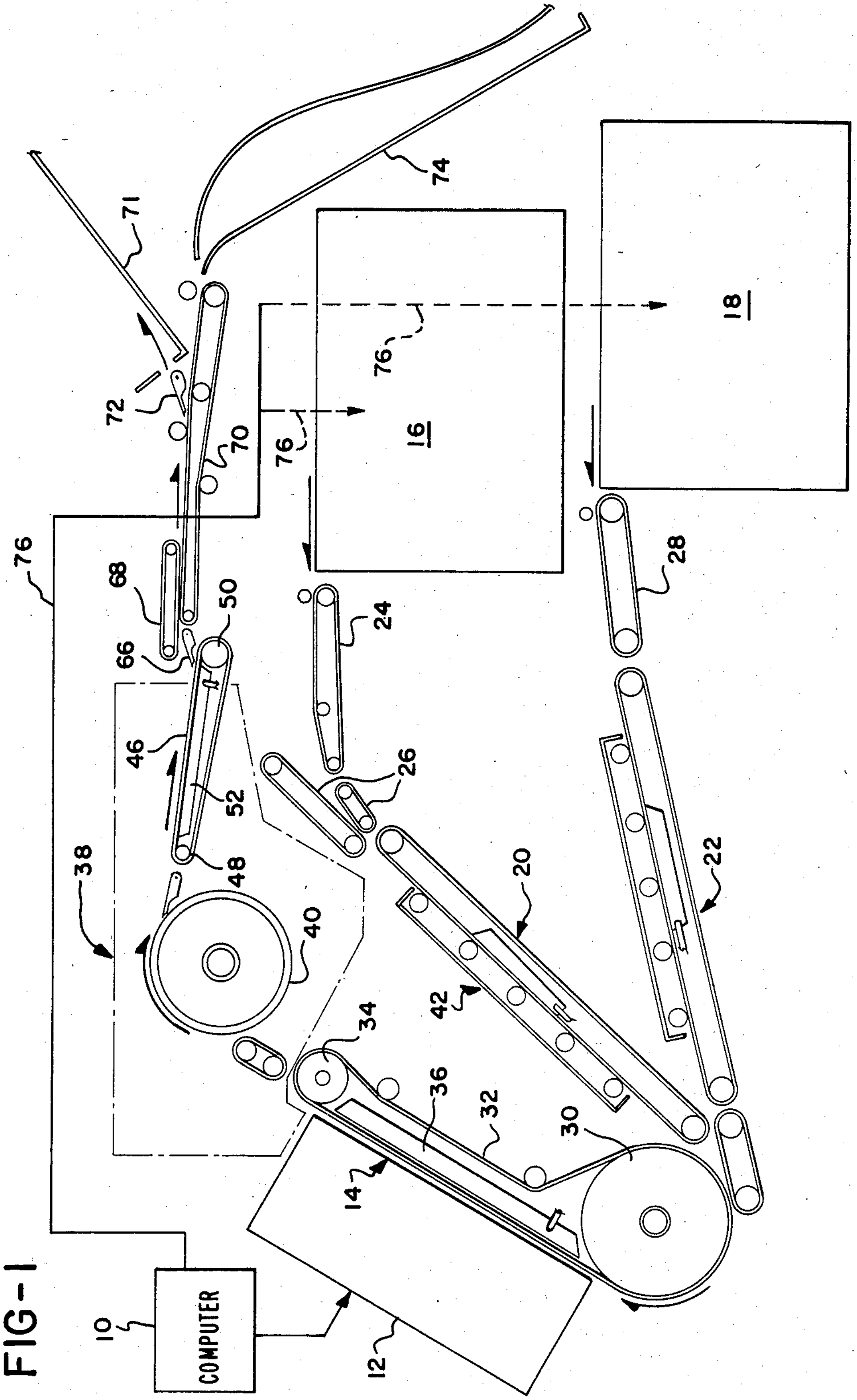
FIG. 1 is a schematic side view of a printing system to which the present invention is applicable.

FIG. 1 is a schematic representation of a printing system to which the present invention is applicable. A more complete description of the printing system of FIG. 1 is contained within U.S. Patent Application Ser. No. 06/606,449, filed 5-1-84, entitled "Duplex Printing System," which is assigned to the same assignee as the present application and is incorporated herein by reference.

Printing control information is applied by a computer 10 to an ink drop or ink jet printer 12. The printer 12 selectively prints the desired images which are represented by image data within the computer 10 onto copy sheets of paper transported past a print station indicated generally at 14. A pair of supply stations 16 and 18 provide blank sheets of copy paper to associated sheet feed and alignment sections 20 and 22, respectively.

Sheets of paper from supply station 16 are applied to sheet feed and alignment section 20 via belts 24 and 26, while sheets from supply station 18 are transported to sheet feed and alignment section 22 by belt transport 28. A vacuum drum 30 receives a series of belts 32 which extend around drum 30 and roller 34 to pass over a vacuum plenum 36. Sheets supplied to the drum 30 are carried on the belts 32 past the print station 14.

After being printed, the sheets are delivered to a drying station 38 which includes drying means, such as those disclosed in U.S. Patent Application Ser. No. 06/615627, filed 5-31-84, entitled "Radio Frequency Dryer" which is assigned to the same assignee as the present application and is incorporated herein by reference, and a vacuum drum 40. Belts 46 extend around rollers 48 and 50 and a vacuum plenum 52 to which a partial vacuum is applied. A gate 66 strips the sheets from the belt 46 and delivers them to an output means. Alternatively, gate 66 may direct the sheets to an inverter (not shown) for inversion and return to the paper path, thereby enabling reverse side printing. The output means includes belts 68 and 70 which deliver the sheet to an output sample tray 71 or to an accumulator tray 74 dependent upon the position of a stripping gate 72. The closed sheet path through the printing machine of FIG. 1 is sufficiently long with respect to the size of the copy sheet that multiple copy sheets may be within the path simultaneously. In a typical embodiment, up to five sheets may occupy the path at any one time.

The print density for each sheet to be printed is determined by monitoring image data which define the images to be printed on the sheet to determine the number of ink drops required for printing the images. The computer 10 in response to print density signals controls the intersheet spacing between successive sheets fed into the printing system as indicated by control lines 76.

The image data representative of images to be printed on a copy sheet are formed into scan strips with each strip comprising four scan lines of image data. The particular organization of the image data forms no part of the present invention. However, an appropriate organization is disclosed in U.S. Patent Application Ser. No. 559,142 which was filed on Dec. 7, 1983, is assigned to the same assignee as the present application and is incorporated herein by reference.

Figure 2:
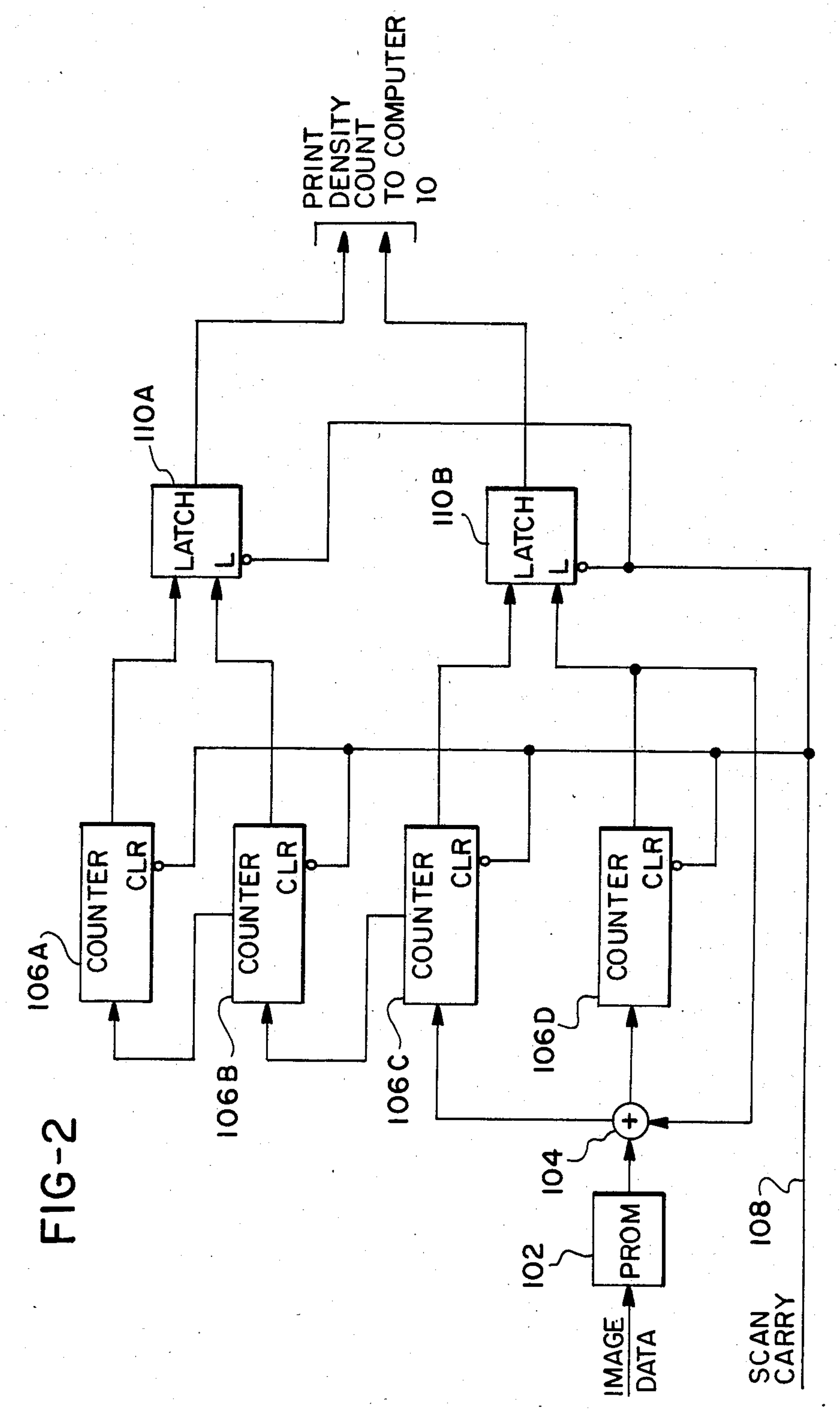
FIG. 2 is a block diagram of circuitry for generating print densities to be used by the printing system of FIG. 1 to appropriately set the intersheet spacing between successive sheets.

As shown in FIG. 2, the data of the scan strips are monitored and applied to translator means comprising a programmable read-only memory (PROM) 102. The PROM 102 generates a partial sum output signal corresponding to the 4 bits of image data which are applied thereto and address the PROM 102. For example, if 3 of the 4 bits of image data are "ones" (indicating that the corresponding pixels are to be printed) and one of the 4 bits is a "zero" (indicating the corresponding pixel is not to be printed), the partial sum is equal to three.

Of course, other translator means, for example, an adder circuit, could be utilized to translate the incoming 4 bits of image data to arrive at a partial sum for accumulating the number of pixels to be printed on a given copy sheet. However, the PROM is convenient and permits processing versatility in the event that the image data are presented in other data formats.

For example, a set of 4 data bits could correspond to coded grayscale values for four-by-four blocks of pixels as described in the previously referenced U.S. Patent Application Ser. No. 559,142. In that event, the PROM 102 can be conveniently programmed to generate the number of pixels to be printed for a given grayscale value of a four-by-four block of pixels, i.e., the correct partial sum for the portion of the image represented by the 4 data bits.

The block diagram circuitry of FIG. 2 is sized to accumulate the number of pixels to be printed for 4 scan strips, i.e., 16 scan lines. Each partial sum generated by the PROM 102 is added to any previous sum which has been accumulated for a series of 16 scan lines by means of an adder circuit 104. A 16 bit counter circuit 106 is used to accumulate the sum since the maximum count is 16 scan lines times 3,456 print decisions per scan line (presuming an $8\frac{1}{2}$ inch wide sheet of copy paper with approximately 380 pixels per inch) which is less than the capacity of the 16 bit counter circuit 106.

The 16 bit counter circuit 106 is constructed from four 4 bit counter circuits 106A–106D. Since the maximum partial sum is equal to 15, only the carry bit is used for the higher order 12 bits of the sum which are accumulated in the 4 bit counter circuits 106A–106C, and the counter circuit 106D functions similar to a latch circuit. The recognition of the limitation of partial sums to 15 permit the counter circuits 106A–106D to be used rather than adder circuits for the accumulation of the print decision counts.

After 16 scan lines (4 scan strips) have been received by the print density accumulator of FIG. 2, a scan carry signal is generated by the computer 10 and applied to a conductor 108. The scan carry signal on the conductor 108 loads the accumulated print density count for the 16 scan lines into latch circuits 110 and clears the pel density counters 106A–106D. The computer 10 determines the print density counts for each series of 16 scan lines by reading the latch circuits 110 and accumulates the 16 line counts until a total print density count has been accumulated for a sheet to be duplicated. The total print density counts accumulated by the computer 10 are utilized to determine a presheet gap and a postsheet gap.

The determination of specific intersheet gaps for given print densities must be determined empirically for a given ink drop duplicator system and associated dryer. Once the appropriate correlations are made, the determination of appropriate intersheet gaps are easily performed by the duplicator system control computer 10.

One duplicator system incorporating the present invention included a 19 inch path through the sheet dryer. In that system, the intersheet gaps varied from a minimum gap of 2 inches for print densities up to 15% area coverage, to a maximum gap of 17 inches for the maximum print densities to be encountered with the variations being approximately linearly increased in accordance with print density to produce $\frac{1}{4}$ inch incremental changes in the sheet gaps.

A large variety of implementations, both hardware and software, for the present invention will be apparent to those skilled in the art. For instance, a program for setting the intersheet gap between successive copy sheets is disclosed in the above referenced U.S. Patent Application Ser. No. 06/606,449, filed 5-1-84. It is noted that, while the control of drying is a major objective of intersheet gap control, other benefits can also be obtained. For example, data transmission delays caused by high data compression ratios can be accommodated by adjusting the intersheet gaps.

While the method described herein and the apparatus for implementing that method constitute preferred embodiments of this invention, it is to be understood that the invention is not limited to this precise method and form of apparatus, and that changes may be made therein without departing from the scope of the invention which is defined in the appended claims.

What is claimed is:

1. A printing system wherein image patterns represented by image data are formed by directing ink drops onto paper sheets in response to said image data, said printing system comprising:

printer means connected for printing image patterns represented by said image data, said image patterns being formed by varying numbers of ink drops dependent upon the corresponding patterns;

transport means for conveying said sheets adjacent to said printer means such that said image patterns may be printed thereon, said transport means operating at a substantially constant speed;

sheet feeder means for feeding said sheets to said transport means;

dryer means for receiving and drying printed sheets conveyed by said transport means;

image data monitor means responsive to said image data for determining the print density for each sheet; and control means for operating said sheet feeder means to feed said sheets such that the intersheet gaps on said transport means are based on the print density for each sheet whereby the operation of said dryer means is improved.

2. A printing system as claimed in claim 1 wherein said dryer means receives a substantially fixed energy input.

3. A printing system as claimed in claim 2 wherein said image data monitor means comprises:

translator means for converting said image data into the print density represented by the number of ink drops required to print the image patterns defined by said image data; and accumulator means for accumulating the number of ink drops required for printing the image patterns on each of said sheets.

4. A printing system as claimed in claim 3 wherein said translator means comprises a programmable read-only memory.

5. A printing system as claimed in claim 4 wherein said accumulator means comprises a counter circuit.

6. In a printing system wherein images represented by image data are formed by directing ink drops onto paper sheets with desired images being formed by depositing only selected ink drops on said paper sheets and comprising printer means for generating and selecting ink drops corresponding to an image to be printed in response to said image data, transport means for conveying sheets of paper at a substantially constant speed in a printing relationship past said printer means, sheet feeder means for feeding paper sheets into said transport means, and dryer means for receiving and drying printed sheets conveyed by said transport means, a method for controlling said sheet feeder means to improve the operation of said printing system comprising the steps of:

determining the print density of each paper sheet fed to said transport means; and operating said sheet feeder means to define spacing between successive paper sheets on said transport means dependent upon the print density of said sheets.

7. A method as claimed in claim 6 further comprising the step of providing a substantially fixed energy input to said dryer means.

8. A method as claimed in claim 7 wherein the print density represented by the number of selected ink drops to be deposited on each paper sheet is determined by the steps of:

translating said image data into the corresponding numbers of selected ink drops; and accumulating said numbers of selected ink drops for each paper sheet.

9. A method as claimed in claim 8 wherein said accumulating step is performed by counting said numbers of selected ink drops for each paper sheet.

* * * * *